United States Patent Office 3,309,400
Patented Mar. 14, 1967

3,309,400
PROCESS FOR THE PRODUCTION OF
PHTHALOYLPYRROCOLINES
Walter Jenny, Basel, Switzerland, assignor to Ciba Limited, Basel, Switzerland, a Swiss company
No Drawing. Filed Apr. 6, 1964, Ser No. 357,803
Claims priority, application Switzerland, Apr. 11, 1963, 4,661/63; Oct. 2, 1963, 12,113/63; Mar. 9, 1964, 2,990/64
15 Claims. (Cl. 260—295)

It is known that when 2:3-dihalo-1:4-naphthoquinone is condensed with acetoacetic ester and pyridine in alcohol, phthaloylpyrrocolinocarboxylic acid ester of the formula (1)
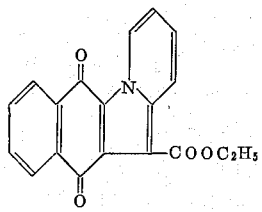

is obtained in a yield of about 45% (see, for example E. F. Pratt et al., J. Org. Chem. 19, 176 [1954]). Since various side reactions occur during the condensation, it is not possible to improve the yield substantially in the process mentioned.

The present invention is based on the observation that phthaloylpyrrocolines, especially those of the formula (2)
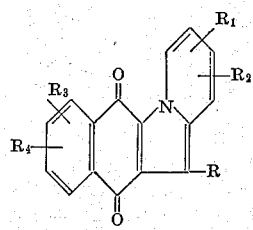

in which $R_1$ and $R_2$ each represents a hydrogen atom or an alkyl group, it being possible for two adjacent radicals to form a 6-ring together with the carbon atoms of the pyridine rings, $R_3$ and $R_4$ each represents a hydrogen atom or a halogen atom or a nitro group and R represents a carbalkoxy group, a cyano or an acyl group, are obtained in excellent yield when a 2:3-dihalo-1:4-naphthoquinone is reacted with a pyridine base, in which the carbon atoms adjacent to the nitrogen atom are unsubstituted, and with a halomethyl compound of the formula (3)
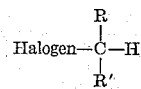

in which R represents an electron acceptor, R′ a hydrogen atom, an alkyl group, an aryl group or an electron acceptor.

As 2:3-dihalonaphthoquinones there may be mentioned, for example, 2:3-dibromo- and especially the 2:3-dichloro-1:4 naphthoquinones, for example 2:3-dichloronaphthoquinone or 2:3:6-trichloronaphthoquinone or 5-nitro-2:3-dichloro-1:4-naphthoquinone.

As pyridine bases there may be mentioned primarily pyridine itself and also β- or γ-picoline or isoquinoline.

Of the halomethylene compounds of Formula 3 there are preferably used those of the formula Cl—CH$_2$—R

in which R represents a carbalkoxy group, a cyano or an acyl group.

As examples of suitable compounds of Formula 3 there may be mentioned: Chloroacetic acid methyl or ethyl ester, chloroacetonitrile, chloroacetic acid phenylamide, chloroacetic acid, chloroacetylchloride, chloroacetic aid anhydride, chloro- and bromoacetophenone, 4-phenylphenacetyl bromide, chloroacetone, bromoacetone, bromomalonic acid diethyl ester, bromoacetic acid ester, 2-chloromethylpyridine and the compounds of the following formulae Cl—CH$_2$—CO—CH=CH—C$_6$H$_5$ Cl—CH$_2$CO—C$_6$H$_4$CO—H$_2$Cl Cl—CH$_2$—COCO—CH$_2$Cl

It can be taken as certain that from the above-mentioned halomethyl compounds of the Formula 3 there are formed with the pyridine bases, in a first stage of the process, compounds of the pyridinium salt type, for example, (4)
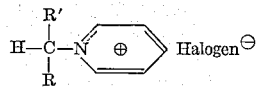

which then react further. These intermediate compounds can also be obtained directly and advantageously prior to the main reaction by King's reaction from pyridine bases and methyl or methylene compounds of the formula (5)

by the action of halogen, preferably iodine or bromine. Instead of pyridine bases, it is also possible to employ thiourea or dimethylsulfoxide for this preliminary reaction.

The following methyl compounds may be mentioned as examples: Acetophenone, 4-methoxyacetophenone, 2-methylpyridine, quinaldine, 1:4-diacethylbenzene, 1:3:5-triacetylbenzene,4:4′-diacethyl-diphenylether, 4:4′-diacethyldiphenyl sulfide, 4:4′-diacetyldiphenylene oxide, 2-acetylnaphthalene and benzalacetone.

The use of the King reaction enables the present process to be applied in those cases where the corresponding halomethyl compounds are accessible with difficulty, thus, for example, in the case of quinaldines and of acetophenones containing hydroxyl groups or which are otherwise capable of being halogenated easily in the nucleus.

In the reaction, the dihalonaphthoquinone and the haloalkyl compound of Formula 3 or the pyridinium salt compound of Formula 4 are preferably used in equimolar amounts, whereas it is expedient to employ at least 3 to 5 mols of the pyridine base to 1 mol of the dihalonaphthoquinone. It has been found, in fact, that the yield when 4 mols of the pyridine base are used is generally better than when 3 mols are used, whereas when the King reaction is employed an increase to 5 mols is advantageous.

The reaction is advantageously carried out at elevated temperature, i.e. at at least 50° C., generally above 80° C., in a solvent or distributing agent which is inert under the reaction conditions. As such there may be used, preferably, aliphatic or especially cyclic ethers boiling at at least 50° C., for example tetrahydrofuran, dioxane or glycol dimethylether. As further solvents there may be mentioned: methyl ethyl ketone, ethylene carbonate, pyridine, isoquinoline, N-methylpyrrolidene, dimethylformamide, chlorobenzene, tetrahydrothiophene-S-dioxide, dichlorobenzene or nitrobenzene.

In contrast to the known processes for the production of phthaloylpyrrocolines, which employ alcohols as solvents, alcohols prove to be less suitable in the process according to the invention.

The reaction can be carried out advantageously in such manner that the dihalonaphthoquinone and the halomethyl compound or the pyridinium salt are heated in the presence of the inert solvent.

If pyridine or the desired pyridine base is employed as solvent, the regeneration of the solvent is simplified. In this case, the procedure may be that dihalonaphthoquinone is introduced into the reaction mixture at elevated temperature.

If a bifunctional halomethyl compound or a corresponding pyridinium salt is employed, i.e. a compound in which the halomethyl group or the corresponding grouping obtained after the King reaction occurs twice in the same molecule, the present process can be so applied that a molecule with two phthaloylpyrrocoline radicals is formed.

The use of asymmetrical compounds with a halomethyl and an activated methyl group, for example, 4-chloroacetylaminoacetophenone or the chloroacetyl quinaldines, permits, in combination with the King reaction, the synthesis of asymmetrical compounds with two phthaloylpyrrocoline radicals.

For working up, the reaction mixture is advantageously diluted with alcohol and water, according to the solvent employed, the phthaloylpyrrocoline being precipitated in a crystalline state and easily isolated by filtering off. The compounds obtained in accordance with this process constitute valuable dyestuffs or intermediate products for dyestuffs.

In the following examples, the parts, unless otherwise indicated, mean parts by weight, the percentages mean percentages by weight and the temperatures are given in degrees centigrade. The melting points were determined by means of an electrically stage microscope.

*Example 1*

113.5 parts of 2:3-dichloronaphthoquinone-(1:4) and 61.5 parts of chloracetic acid ethyl ester were heated in 60 parts of dioxane to 80° C., while stirring. 158 parts of pyridine were added dropwise to this suspension during 40 minutes. In this process, the temperature of the reaction mixture slowly rose to 103° C. After further stirring for 15 minutes, the reaction mass was mixed with 200 parts of ethanol, filtered with suction, and the product was washed with 275 parts of ethanol and dried in vacuo at 65 to 70° C. 134 parts of an orange-colored finely crystalline powder were obtained, the powder melting at 153–154° C. The compound formed was practically pure 2:3-phthaloylpyrrocolino-1-carboxylic acid ethyl ester of the formula

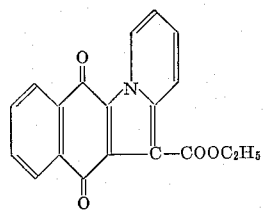

which had therefore been produced in a yield of 84% of the theoretical yield. Identity with the compound produced by the known process from dichloronaphthoquinone, pyridine and acetoacetic ester in alcohol can be shown from a comparison of the melting points and infra-red spectra.

The like reaction using tetrahydrofuran, pyridine, chlorobenzene, o-dichlorobenzene or nitrobenzene as solvent gives a very similar result.

*Example 2*

113.5 parts of 2:3-dichloronaphthoquinone-(1:4) and 37.77 parts of chloracetonitrile were heated in 60 parts of dioxane to 80° C., while stirring. 158 parts of pyridine were added dropwise to this suspension during 35 minutes. In this process, the temperature of the reaction mixture slowly rose to 110° C. The reaction mass was worked up as described in Example 1. 126 parts of a brownish orange finely crystalline powder were obtained, the powder melting above 300° C. A comparison with the 1-cyano-2:3-phthaloylpyrrocoline of the formula

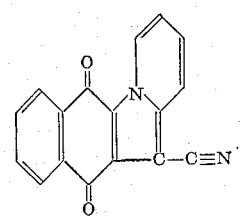

produced by the known process from dichloronaphthoquine, pyridine and cyanoacetic ester in alcohol showed that the same compound had been formed in a yield of about 92%.

*Example 3*

56.75 parts of 2:3-dichloronaphthoquinone-(1:4) and 52.4 parts of α - chloro-3-nitro-acetophenone (of 95% strength) were heated in 150 parts of dioxane to 80° C. while stirring. 79 parts of pyridine were added dropwise to this suspension during 35 minutes. In this process, the temperature of the reaction mixture slowly rose to 110° C. After further stirring for 25 minutes at a bath temperature of 96 to 98° C., the reaction mass was worked up as described in Example 1. 89 parts of a red finely crystalline powder were obtained. Extraction with chlorobenzene gave 84.5 parts (85.5% of the theoretical yield) of a pure compound crystallising from chlorobenzene in the form of red needles, and of the presumed formula

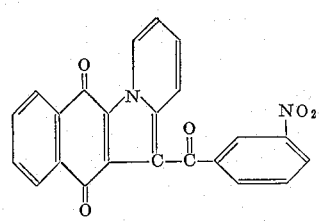

The new product melted at 282 to 283° C.

Analysis.—$C_{12}H_{12}N_2O_5$: Calculated—C, 69.70%; H, 3.05%; N, 7.07%. Found—C, 69.9%; H, 3.2%; N, 7.0%.

*Example 4*

22.7 parts of 2:3-dichloronaphthoquinone-(1:4) and 16.9 parts of chloracetic acid anilide were heated in 50 parts of dioxane to 80° C. while stirring. 31.6 parts of pyridine were added dropwise to the solution produced, during 50 minutes. In this process, the temperature of the reaction mixture slowly rose to 85° C. After further stirring for 30 minutes, 50 parts of ethanol were added and the mixture was well stirred, allowed to cool, filtered with suction and the product washed well with ethanol, and dried in vacuo, at 60 to 70° C. The crude product obtained in this way was purified by boiling with water and crystallisation from benzene, chlorobenzene or dimethylformamide. The pure compound formed small violet crystals, which melted at 256 to 257° C. The compound presumably corresponds to the formula

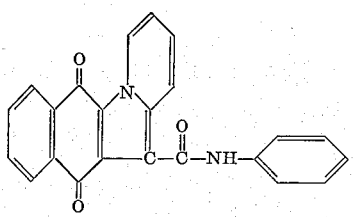

*Analysis.*—$C_{23}H_{14}N_2O_3$: Calculated—C, 75.4%; H, 3.85%; N, 7.65%. Found—C, 75.2%; H, 3.9%; N, 7.8%.

Example 5

11.35 parts of 2:3-dichloronaphthoquinone-(1:4) and 13.75 parts of 4-phenyl-phenacylbromide were heated in 20 parts of dioxane to 80° C., while stirring. 16.7 parts of pyridine were thereupon added dropwise at the same temperature during 10 minutes, the tempertaure increasing to 103° C. After further stirring for 20 minutes at a bath temperature of 80° C., the mixture was allowed to cool, mixed with 25 parts of ethanol, filtered with suction and the product washed with ethanol, and dried in vacuo at 70 to 75° C. The compound formed crystallised from chlorobenzene in red crystals, which melted at 240 to 242° C.

Yield of pure compound: 79.4% of the theoretical yield. The compound presumably corresponds to the formula

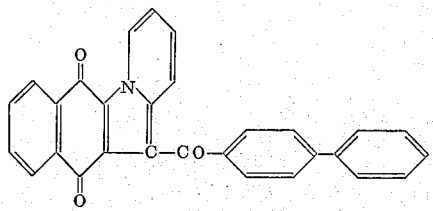

*Analysis.*—$C_{29}H_{17}NO_3$: Calculated—C, 81.48%; H, 4.01%; N, 3.28%. Found—C, 81.3%; H, 4.2%; N, 3.3%.

Example 6

22.7 parts of 2:3-dichloronaphthoquinone-(1:4) and 17.0 parts of 2-chloromethylpyridine hydrochloride were heated in 30 parts of dioxane to 77° C., while stirring. 32 parts of pyridine were thereupon added dropwise at the same temperature, during 35 minutes. In this process, the temperature rose to 87° C. After further stirring for 40 minutes at 80° C., the mixture was allowed to cool, mixed with ethanol, filtered with suction and the product washed with ethanol. The yellow residue obtained in this way was dissolved in hot ethanol and mixed with the same amount of water. When the warm aqueous-alcoholic solution was mixed wiht dilute sodium hydroxide solution, the reaction product was precipitated as a red deposit. This was filtered off with suction, washed until neutral and dried in vacuo at 65 to 70° C. By crystallisation from benzene, the new compound of the presumed formula

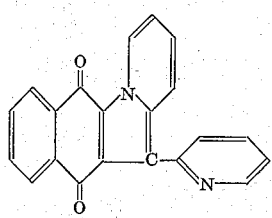

was obtained as a finely crystalline brick-red powder. Melting point 226 to 228° C.

*Analysis.*—$C_{21}H_{12}N_2O_2$: Calculated—C, 77.8%; H, 3.71%; N, 8.64%. Found—C, 77.6%; H, 3.7%; N, 8.8%.

Example 7

113.5 parts of 2:3-dichloronaphthoquinone-(1:4) and 37.7 parts of chloroacetonitrile were heated in 120 parts of dioxane to 75° C. while stirring. 258 parts of isoquinoline were thereupon added dropwise during 40 minutes, the temperature rising to 110° C. After further stirring for 15 minutes at a bath temperature of 90 to 95° C., the mixture was allowed to cool, mixed with ethanol, filtered with suction and the product washed with ethanol and dried in vacuo at 65 to 70° C. The compound obtained in this way could be purified by crystallisation from dimethyl formamide. It was a finely crystalline yellow powder which melted above 300° C. The formula corresponding to the substance formed is presumably

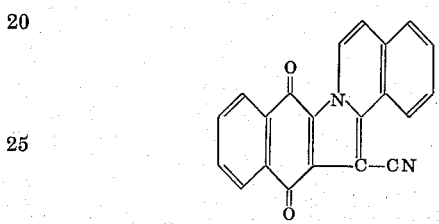

*Analysis.*—$C_{21}H_{10}N_2O_2$: Calculated—C, 78.25%; H, 3.10%; N, 8.69%. Found—C, 78.33%; H, 3.17%; N, 8.80%.

Example 8

61.5 parts of chloroacetic acid ethylester were used instead of the chloroacetonitrile in Example 7, and the corresponding carboxylic acid ethyl ester was obtained in good yield. This compound could also be purified by crystallisation from dimethyl formamide, being obtained as a finely crystalline yellow powder.

Example 9

26.1 parts of 2:3:6-trichloronaphthoquinone-(1:4) and 12.3 parts of chloroacetic acid ethyl ester were heated in 60 parts of dioxane to 79° C., while stirring. 31.6 parts of pyridine were thereupon added dropwise during 25 minutes. After further stirring for 15 minutes at a bath temperature of 82° C., this mixture was worked up as described in the foregoing examples. A finely crystalline orange-colored powder with a very wide melting point range was obtained, which probably consisted of an isomeric mixture of the presumed formula

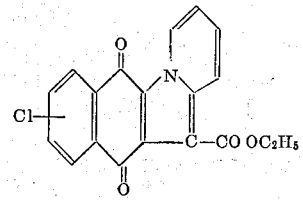

*Analysis.*—$C_{19}H_{12}ClNO_4$: Calculated—N, 3.96%; Cl, 10.04%. Found—N, 4.1%; Cl, 10.1%.

Example 10

56.75 parts of 2:3-dichloronaphthoquinone-(1:4) and 59.75 parts of bromomalonic acid diethyl ester were heated in 60 parts of dioxane to 80° C., while stirring. 79 parts of pyridine were thereupon added dropwise during 35 minutes and the temperature rose to 92° C. After further stirring for 3 hours at 80° C., 200 parts of ethanol were added and the mixture was well stirred and filtered with suction, and the product washed with ethanol and dried in vacuo at 70 to 75° C. The reaction product was identical with that of Example 1. Yield: 61 parts (76.5% of the theoretical yield).

Example 11

15 parts of 4-methoxyacetophenone and 25.4 parts of iodine in 80 parts of pyridine were mixed for 3 hours at a bath temperature of 95 to 97° C. 30 parts of dioxane were thereupon added at a temperature of 75° C. and 22.7 parts of 2:3-dichloronaphthoquinone-(1:4) were introduced during 20 minutes. After stirring for another 5 hours at a bath temperature of 95 to 97° C., the mixture was cooled, 100 parts of ethanol added and further stirring was carried out for 12 hours at room temperature. The mixture was filtered with suction, the product washed with ethanol and dried in vacuo at 65 to 70° C. 27.75 parts of a red crystalline powder which melted at 215 to 217° C. were obtained. The new compound, which presumably corresponds to the formula

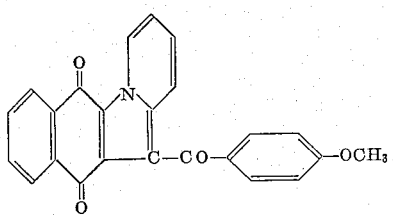

crystallised from nitrobenzene in small luminous red crystals (melting point: 219 to 220° C.).

Analysis.—$C_{24}H_{15}NO_4$: Calculated—C, 75.58%; H, 3.86%; N, 3.67%. Found—C, 75.55%; H, 4.01%; N, 3.72%.

Example 12

63.5 parts of iodine were introduced at room temperature while stirring into a mixture consisting of 35.8 parts of quinaldine and 150 parts of dry pyridine. After stirring for 2 hours on a boiling water bath, 56.75 parts of 2:3-dichloronaphthoquinone-(1:4) were added during 13 minutes, the internal temperature rising to 113° C. After another 50 parts of pyridine had been added, the mixture was stirred for a further 2 hours at a bath temperature of 95° C. and cooled, 100 parts of ethanol were added and the mixture was filtered with suction. The red residue, which was washed well with alcohol, was dried in vacuo at 65 to 70° C. The new compound was advantageously purified by boiling with water and crystallisation from dimethyl formamide.

Melting point: 309 to 310° C.

The compound presumably corresponds to the formula

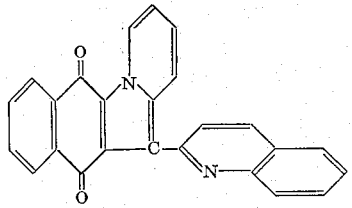

Analysis.—$C_{25}H_{14}N_2O_2$: Calculated—C, 80.20%; H, 3.77%; N, 7.48%. Found—C, 79.99%; H, 4.00%; N, 7.38%.

Example 13

12 parts of acetophenone and 25.4 parts of iodine were heated in 40 parts of pyridine for one hour on a steam bath. 30 parts of dioxane and 22.7 parts of 2:3-dichloronaphthoquinone-(1:4) were thereupon added, while stirring. In this process, the temperature of the reaction mixture rose to 110° C. Finally, further stirring was carried out for one hour at a bath temperature of 82° C. The mixture was allowed to cool and 80 parts of ethanol were added at room temperature. The red precipitate was filtered off with suction, washed with alcohol and dried in vacuo at 65 to 70° C. The compound, which was obtained in good yield, was purified by crystallisation from dimethyl formamide. Melting point: 253 to 255° C.

The compound presumably corresponds to the formula

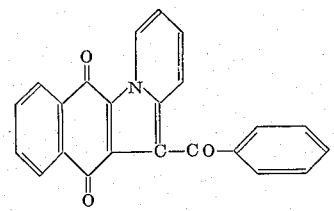

Analysis.—$C_{23}H_{13}NO_3$: Calculated—C, 78.65%; H, 3.73%; N, 3.98%. Found—C, 78.8%; H, 3.7%; N, 4.1%.

Example 14

16 parts of bromine were added dropwise during one hour to a solution of 14.3 parts of quinaldine in 69 parts of dry pyridine, while cooling. The solution obtained was allowed to stand for 15 hours without cooling, the temperature rising from 7 to 66° C. in the first two hours. 22.7 parts of 2:3-dichloronaphthoquinone-(1:4) were thereupon added. After stirring for 5½ hours at a bath temperature of 97 to 98° C., the mixture was allowed to cool, 100 parts of ethanol were added and the precipitate formed was filtered with suction, washed with ethanol and dried in vacuo at 65 to 70° C. The red compound obtained in good yield was recrystallised from dimethyl formamide and proved to be identical with the reaction product of Example 12.

Example 15

48.6 parts of 1:4-diacetylbenzene and 154 parts of iodine were mixed in 500 parts of dry pyridine for 2 hours at a bath temperature of 95 to 97° C. 500 parts of dimethyl formamide are then added at an internal temperature of 84 to 85° C. and 136.2 parts of 2:3-dichloronaphthoquinone-(1:4) were introduced during 10 minutes. After stirring for 5 hours at a bath temperature of 95 to 97° C., the mixture was allowed to cool, filtered with suction and the product washed with boiling alcohol and boiling water and dried in vacuo at 65 to 70° C. A red powder was obtained in good yield, which powder did not melt up to 320° C. The compound formed, of the presumed formula

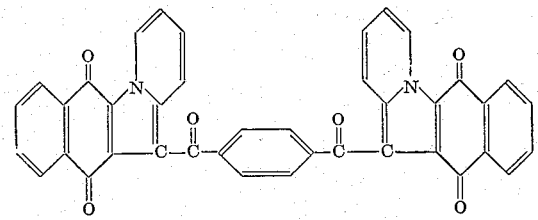

could only be dissolved in organic solvents with great difficulty and could be recrystallised from a large quantity of boiling dimethyl formamide or nitrobenzene.

Example 16

227 parts of 2:3-dichloronaphthoquinone-(1:4) and 131 parts of O:O'-dichloroacetylhydroquinone were heated in 200 parts of dimethyl formamide to 80° C., while stirring. 316 parts of pyridine were thereupon added dropwise, during 35 minutes, the temperature rising to 105° C. After further stirring for 15 minutes at a bath temperature of 90° C., 800 parts of warm ethanol were immediately added, the mixture well stirred and filtered with suction at 20° C., and the product washed with boiling ethanol and boiling water and dried in vacuo at 65 to 70° C. The orange-colored compound obtained was very difficult to dissolve and could be further purified by boiling with dimethyl formamide.

Example 17

76.2 parts of 4:4'-diacethyldiphenyl ether and 154 parts of iodine were mixed in 500 parts of pyridine for 2 hours at a bath temperature of 95 to 97° C. 500 parts of dimethyl formamide were thereupon added at an internal temperature of 85 to 87° C., and 136.2 parts of 2:3-dichloronaphthoquinone-(1:4) were introduced during 15 minutes. After stirring for 5 hours at a bath temperature of 95 to 97° C., the mixture was cooled, filtered with suction at 10° C. and the product well washed with boiling alcohol and boiling water and dried in vacuo at 80 to 85° C. The compound formed, of the presumed formula

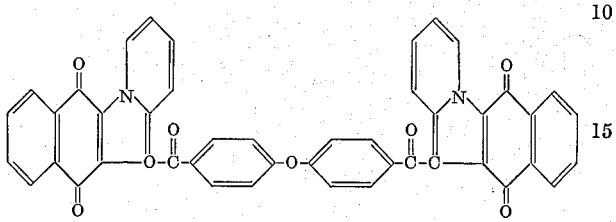

was purified by heating with dimethyl formamide.

Example 18

227 parts of 2:3-dichloronaphthoquinone-(1:4) and 165 parts of N:N' - dichloroacetyl - 2:5 - dichloro-1:4-diaminobenzene were heated in 400 parts of dimethyl formamide to 85° C. while stirring. 316 parts of pyridine were then added dropwise during 40 minutes and the mixture was thereupon stirred for 2½ hours at a bath temperature of 95 to 97° C. Ethanol was mixed with the reaction mass at a raised temperature, the mixture was filtered with suction and the product washed well with boiling ethanol and water, and dried in vacuo at 85 to 90° C. The red compound produced was extremely difficult to dissolve and was further purified by heating with water and dimethyl formamide. It dissolved with a blue color in concentrated sulfuric acid and, on the basis of the analysis results, was undoubtedly a condensation product consisting of one molecule of diamine and two phthaloylpyrrocoline radicals.

Example 19

567.5 parts of 2:3-dichloronaphthoquinone-(1:4) and 307.5 parts of chloroacetic acid ethyl ester were heated in 250 parts of dimethyl formamide to 90° C., while stirring. 790 parts of pyridine were added dropwise to this suspension during 55 minutes. The temperature of the reaction mixture slowly rose to 118° C. during this process. After further stirring for 15 minutes, at a bath temperature of 90° C., 750 parts of water were added to the reaction mass, and the mixture was well stirred and filtered with suction at 20° C. The reaction product, which was washed with ethanol and dried, was identical with the 2:3-phthaloylpyrrocoline-1-carboxylic acid ethyl ester obtained in Example 1. By this process, the pyrrocoline derivative was obtained in a yield of 90%.

What is claimed is:
1. A process for the production of phthaloylpyrrocolines, which comprises reacting a 2:3-dihalo-1:4-naphthoquinone with a pyridine base, in which the carbon atoms adjacent to the nitrogen atom are unsubstituted, and with a member selected from the group consisting of a halomethyl compound of the formula

$$\text{halogen} - \underset{\underset{R'}{|}}{\overset{\overset{R}{|}}{C}} - H$$

and the corresponding pyridinium salt, in which R signifies an electron acceptor selected from the group consisting of a carboxylic acid ester, carbamido, carbanilido, cyano, acyl, α-pyridyl and 2-quinolyl groups, R' a member selected from the group consisting of a hydrogen atom, lower alkyl, a phenyl and a carboxylic acid ester group.

2. A process as claimed in claim 1, wherein pyridine is used as the pyridine base.
3. A process as claimed in claim 1, wherein isoquinoline is used as pyridine base.
4. A process as claimed in claim 1, wherein a 2,3-dihalo-1,4-naphthoquinone of the formula

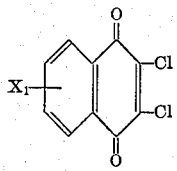

in which $X_1$ as a member selected from the group consisting of a chlorine atom and a nitro group is used as starting material.

5. A process as claimed in claim 1, wherein as starting material is used a compound of the formula $$X - CH_2 - R$$

in which R is a member selected from the group consisting of lower carbalkoxy, cyano, lower aliphatic acyl, benzoyl, carbanilide, pyridyl and quinolyl radicals, and X a member selected from the group consisting of a chlorine and bromine atom and a pyridyl radical.

6. A process as claimed in claim 5, wherein a chloroacetic acid ethyl ester is used as starting material.
7. A process as claimed in claim 5, wherein chloroacetophenone is used as starting material.
8. A process as claimed in claim 5, wherein chloroacetonitrile is used as starting material.
9. A process as claimed in claim 5, wherein 4-phenylacetophenone is used as starting material.
10. A process as claimed in claim 1, wherein there is used as starting material a compound of the formula $$XCH_2COY_{n-1} - A - Y_{n-1}COCH_2X$$

in which A is a member selected from the group consisting of phenylene, diphenylene, and diphenylene oxide, X is a member selected from the group consisting of a chlorine and a bromine atom and a pyridyl radical Y is an oxygen atom and $n$ a whole number from 1–2.

11. A process as claimed in claim 1, wherein the reaction is carried out in an inert organic solvent.
12. A process as claimed in claim 11, wherein the inert organic solvent is an ether, the boiling point of which is at least 50° C.
13. A process as claimed in claim 11, wherein a pyridine base is used as solvent.
14. A process as claimed in claim 11, wherein a lower dialkyl formamide is used as solvent.
15. A process as claimed in claim 11, wherein the reaction is carried out at a temperature within the range from 50° C. to the boiling point of the solvent.

References Cited by the Examiner

Chemical Abstracts I, vol. 50, par. 15, 531i to 15, 532c, November 1956.
Chemical Abstracts II, vol. 56, par. 8888i (1962).
Pratt et al. (I), J. of Org. Chem., vol. 19, No. 2, pages 176–82.
Pratt et al. (II), J. Am. Chem. Soc., vol. 79, No. 5, pages 1212–1216 (1957).

JOHN D. RANDOLPH, *Primary Examiner.*
WALTER A. MODANCE, *Examiner.*
ALAN L. ROTMAN, *Assistant Examiner.*